No. 642,827. Patented Feb. 6, 1900.
G. SOMMER.
PNEUMATIC VALVE FOR PIPE ORGANS.
(Application filed July 28, 1899.)
(No Model.) 2 Sheets—Sheet 1.
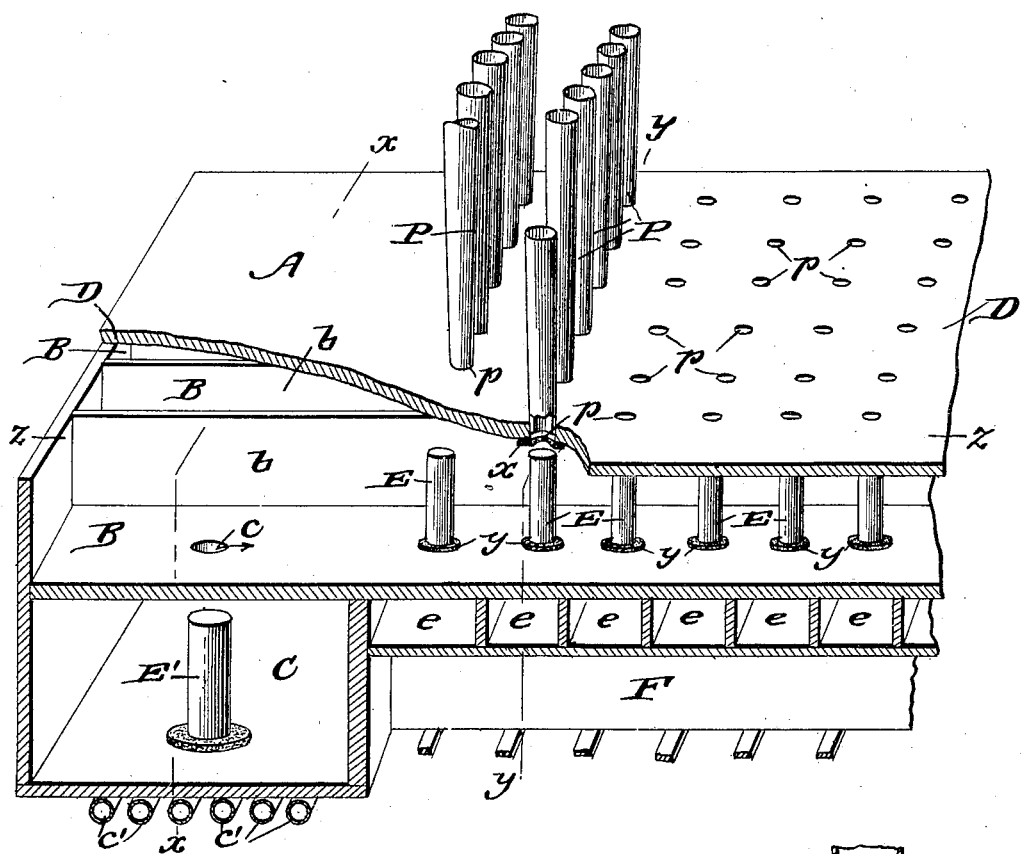
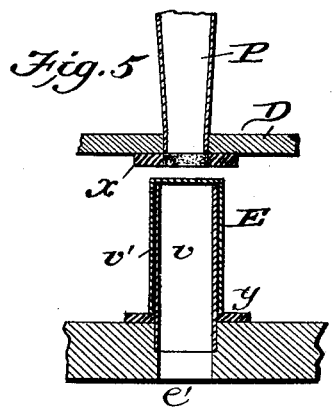
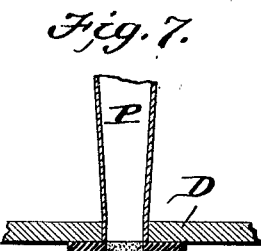
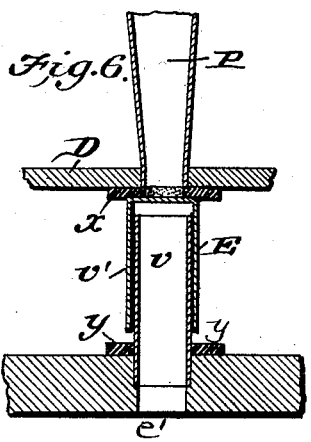
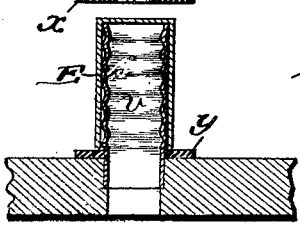
WITNESSES: INVENTOR
Gottlieb Sommer
BY Johnson & Johnson
ATTORNEYS No. 642,827. Patented Feb. 6, 1900.
G. SOMMER.
PNEUMATIC VALVE FOR PIPE ORGANS.
(Application filed July 28, 1899.)
(No Model.) 2 Sheets—Sheet 2.
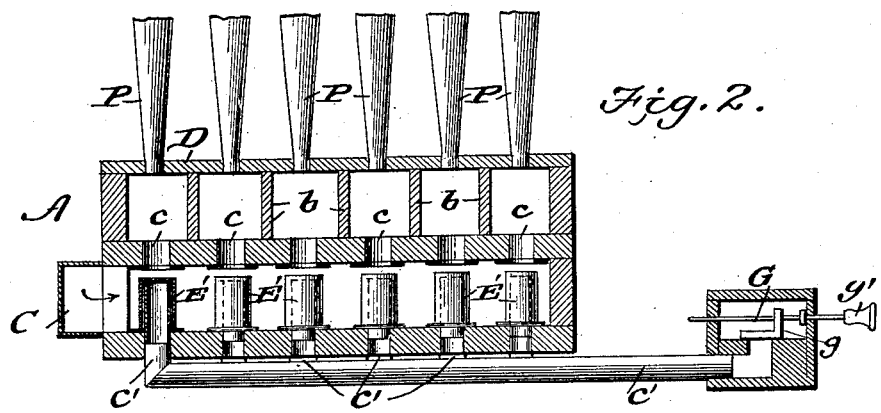
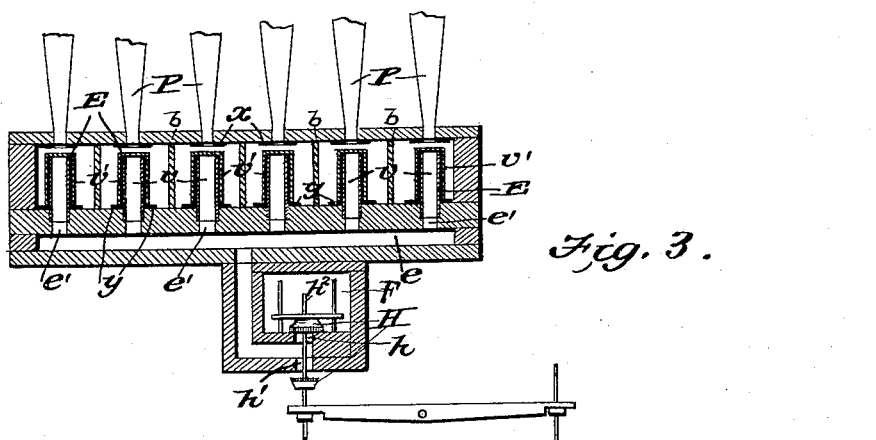
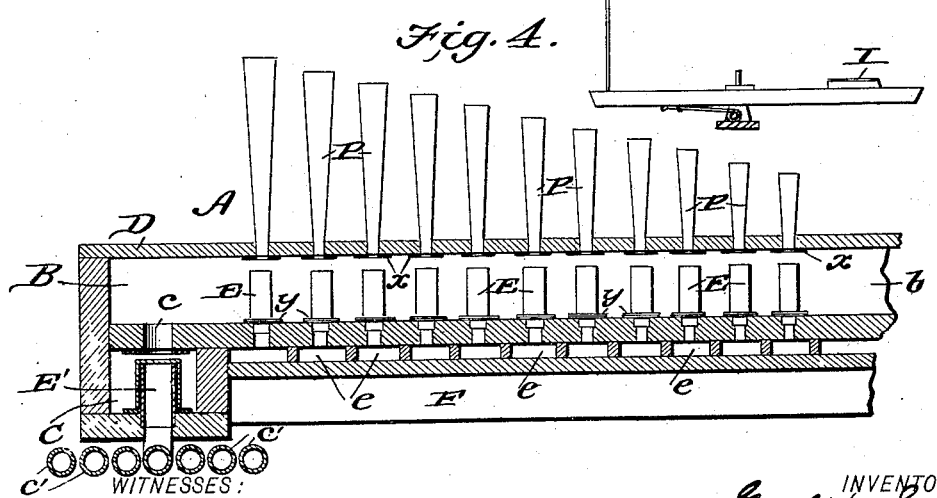

UNITED STATES PATENT OFFICE.

GOTTLIEB SOMMER, OF WILLIAMSPORT, PENNSYLVANIA.

PNEUMATIC VALVE FOR PIPE-ORGANS.

SPECIFICATION forming part of Letters Patent No. 642,827, dated February 6, 1900.

Application filed July 28, 1899. Serial No. 725,403. (No model.)

*To all whom it may concern:*

Be it known that I, GOTTLIEB SOMMER, a citizen of the United States, residing at Williamsport, in the county of Lycoming and State of Pennsylvania, have invented certain new and useful Improvements in Pneumatic Valves for Pipe-Organs, of which the following is a specification.

My invention relates to pipe or reed organs; and the particular improvement resides in the pneumatic valve, whereby its construction renders it sensitive, instantaneous, and noiseless in its action.

In the accompanying drawings I have illustrated my invention as applied to a well-known type of organ wind-chest, wherein—

Figure 1 shows in perspective and partly in section a portion of the wind-chest with its sound-board partly broken away and showing the register wind-chambers and valves or pneumatics therein which control the pipes. Fig. 2 is a vertical section taken on the line $x\ x$ of Fig. 1, showing the stop or register valves and also the pallet-box and slide-valve of the stop-manual, only one of the register-valves being in section. Fig. 3 is a section taken on the line $y\ y$ of Fig. 1, showing the pipe-valves and the pallet-box and puppet-valves and their connection with the key-manual. Fig. 4 is a section taken on the line $z\ z$ of Fig. 1, showing one of the register wind-chambers and its contained pipe-valves. Fig. 5 is an enlarged vertical section of the wind-chest and my telescoping pneumatic valve as seated and the pipe orifice or port for admission of air to the pipe. Fig. 6 is a similar view showing the valve as raised and closing the pipe orifice or port, and Fig. 7 shows my pneumatic valve in which the fixed tubular part is formed with transverse corrugations to reduce the frictional surface of the telescoping parts to a minimum.

In this type of organ the valves are not operated directly by the keys, but are adapted to be operated directly by the admission or escape of the compressed air confined within the body of the valve and controlled by the keys, said interiorly-confined air being of greater tension than that of air in register-chests B.

The wind-chest A has the register wind-chambers B extending longitudinally therein and which are formed by the partitions $b$.

C is the main wind-chest trunk beneath and transversely of the register wind-chambers and which leads directly from the bellows (not shown) and communicates with the register wind-chambers B through the vertical register orifices or ports $c$.

D is the sound-board, which covers the wind-chest A and supports the pipes P, which are seated over ports or orifices $p$ in the sound-board. The pipe-ports $p$ are controlled by the pneumatic or pipe valves E, which are operated by air-pressure from wind-canals $e$, which separately communicate with the wind-duct F, which is independently supplied with compressed air from the bellows.

The register orifices or ports $c$ lead from the main wind-trunk C into their respective register wind-chambers B and are controlled by the register valves or pneumatics E', which are of identical construction and arrangement with the pipe-valves E in the register wind-chambers. The register-valves E' are larger than the pipe-valves and are supplied independently with compressed air from a series of tubes $c'$, which are under the wind-chest C in controllable communication with a register pallet-box and wind-duct G, Figs. 1 and 2, which is independently supplied with compressed air from the bellows. The pressure of air from the wind-duct G to the tube $c'$ and register-valve E' is controlled by the usual system of stop-manuals. (Shown in Fig. 2.)

The puppet-valves H, Fig. 3, control the valve-throats $h\ h'$, and their valve-stems or pallet-wires $h^2$ are connected with the keys I of the organ-manual through the medium of a mechanical connection consisting of the usual system of levers, trackers, and stickers.

Each of the pipes P is controlled by an air-admission valve or pneumatic, which I construct and arrange as seen in the drawings. The valve or pneumatic is composed of two closely-fitting telescoping cylinders formed of sheet metal, the longest or the inner one, $v$, of which is open at both ends and is tightly seated on an annular shoulder formed upon the walls of the port or orifice $e'$ in the bottom of the wind-chamber B and forms the fixed valve-stem $v$, Figs. 5, 6, and 7. The outer or shortest cylinder E is closed at its upper end and telescopes smoothly, but closely, over the stem-cylinder $v$ to form an air-tight valve part $v'$, the upper closed end of which is flat and of greater area than the pipe-port.

Looking at Fig. 3, the compressed air from the canals $e$, flowing through the orifices $e'$ and valve-stem cylinder $v$, will force the telescoping cap-cylinder valve part $v'$ up, and its flat closed end will fit tightly against the sound-deadening and packing washer $x$, which surrounds the throat of the pipe-port $p$, which is directly above the valve-cap, and thus form a perfect seal against the admission of wind through the pipe-port from the wind chambers B. The telescoping valves or pneumatics are very sensitive and sudden in action, both in being raised and falling, and for the purpose of deadening the sound of the striking of the cap part in its lift to close the port I have placed a soft washer $x$ around the port, against which the flat end of the cap will strike without sound and form a perfect seal, as well. A similar packing-washer $y$ is placed on the chamber-board around the fixed valve-stem to deaden the sound of the dropping of the cap-valves, the open end of which is seated thereon and sealed, while the closely-fitting walls of the tubular parts form a seal throughout their length. The countersinking of the stem part of the valve within the bore of the port $e'$ forms a firm and true support for the valve. To render the lifting-and-falling movement of the cap-valve part perfectly true and free from any tendency to bind, I make the tubular parts of lengths about three times their diameters. I employ the same construction of valves to control the air-admission ports of the register wind-chambers as in Fig. 2. In this figure the main wind-trunk which leads from the bellows (not shown) is provided with register-valves E', one for each register wind-chamber B, in this arrangement each valve having a distinct and separate air-supply tube $c'$, which leads to a slide-valve and pallet-box G, the movement of said valve being controlled by a stop $g'$ on the organ. The pipe-valves are operated by the keys I, and the register-valves are operated by the stops. The compressed air in the ducts F, $e$, G, and $c'$ is of relatively greater tension than that in the wind-trunk C and register-chambers B.

The operation of the valve system is as follows: When the organ is silent, the puppet-valves are seated against the lower openings, closing their throats $h'$, and wind-pressure is in consequence in the canals $e$, and the valves are lifted to close the ports $p$, and the pipes P are silent. The stop-valve $g'$ is also open, and wind-pressure is in consequence in the tubes $c'$, and the valves E' assume their raised position to close the ports $c$, leading to the wind-chambers B. In order to make the pipes speak or sound, air-pressure having been accumulated in the bellows, wind-trunk C, and ducts $e$, F, $c'$, and G, one of the stop-manuals is pulled out, which will cut off the pressure from the tube $c'$, and the air-pressure existing at the time in the wind-trunk C will cause the connected valve or pneumatic to fall and permit its connected wind-chamber B to fill from the wind-trunk through the orifice $c$. Then the depression of any key in the manual occasions the drop of the valve-stem and puppet-valve with which said key communicates, shuts off the wind from the wind-duct F to the connected canal $e$, and gives the lead for the escape of the air from the duct $e$ through the exhaust $h'$, Fig. 3, thereby permitting the fall of the cap-valve part under the pressure of the wind existing at the time in the wind-chamber, thereby opening the orifice or port $p$ and causing the pipe P to speak. The relief of pressure upon the key occasions the rise of the valve-stem and puppet-valve with which said key communicates and permits the influx of wind from the wind-duct F into the wind-canal $e$ and thence through the openings into the telescoping valve E, which thereby is instantly raised and closes the port $p$, and the pipe is silent. In like manner pushing in the "stop" will open the valve $g$ and cause the wind from the pallet-box or wind-duct G to lift its connected valve E' and close the port $c$. To render the contact of the walls of the cap-valve part over the fixed valve part as free as possible while maintaining a close sealing-joint between them, the fixed valve part preferably may be formed with transverse corrugations which act as a multiple ring of convex contact-surfaces upon the inner wall of the cap-valve part, and thereby cause it to rise and fall in a true vertical line and with the least impediment from binding or friction.

It is important to note that the cap-valve is controlled solely by the application and release of the air-pressure within the fixed valve part, so that such pressure can only be exerted within the tube upon the closed cap to lift it, while its weight upon the release of such pressure will cause an instant dropping of the valve.

Another important matter is that the valve is raised and held raised by retaining the air within the cap-valve, so that none of it escapes when the valve is raised, and it is maintained on its sealing-seat by a constant and uniform pressure from the ducts F or G, as the case may be. This is an important advantage, for the least relaxation of the pressure in the valve would tend to cause the valve to open the pipe-port or at least to impair its perfect sealing cap-seat.

To produce the best results in the action of the valve, I make the valve-cap part about three inches long and about an inch in diameter with thin walls, and as the quickness of the lift movement will necessarily cause it to strike sharply on its seat the latter is cushioned, and for the same reason the cushioning of the drop movement is important, so that the thrust of the valve upon both its seats is without noise.

It is not intended herein to claim, broadly, a pneumatic-actuated valve composed of telescoping parts; but hitherto, so far as I know and can find, the movable part of such valve has been normally held upon its seat over the pipe-ports by lifting-springs, and such valve part has been constructed with a cushioned hinged cap-section to prevent its imperfect closure of the pipe-ports, which it would be otherwise liable to do by reason of the play which the valve has in its fixed part from a strictly vertical line, as in the patent to Reiter and Sander, of February 21, 1882. In such spring-closed valve the tension of the spring must be overcome in the opening of the valve, and the sensitiveness of such opening is thereby destroyed, its descent being necessarily retarded and rendered uncertain. In my valve its opening is instantaneous upon the release of the air-pressure, and its weight keeps it open until air-pressure is supplied, which projects the valve in a true vertical line upon its port-seat to close the pipe, this perfect movement of the valve being due to its closely-fitting and extended bearing-walls and the action of air-pressure only upon its cap. It is also important to note that in its movements my valve is free to turn upon its closely-fitting walls, and thereby preserve a smooth movement in the sliding surface.

In making the valve of some suitable malleable sheet metal its parts can be produced perfectly true in tubes of very hard and smooth walls, making it a new article of manufacture easily and quickly applied for use.

While I have stated that the longest valve part is fixed in a counterbore in the boads, yet it is obvious that the lower end of such part may have a lip-formed flange and secured thereon.

My valve may be readily applied to the well-known pneumatic-organ.

It will be understood that the valves E for controlling the speaking of the pipes would occupy the register-chamber B, but are omitted from Fig. 2 of the drawings herein to avoid confusion.

I claim—

1. In a pneumatic pipe-organ valve, and in combination with the register-chambers, the wind-chest and the speaking-pipes, of pneumatic valves each composed of tubular telescoping parts having thin sheet-metal walls, the fixed part seated in a bored supporting-board, and a closely-fitting slidable part having a flat cap forming a seating-face and the lifting-surface, the adjacent telescoping surfaces forming a seal against the passage therebetween of interiorly-confined air, as shown and described.

2. In a pneumatic pipe-organ valve and in combination with the register-chambers, the wind-chest and the speaking-pipes, of pneumatic valves each composed of tubular telescoping parts of sheet metal, the fixed part seated in a bored supporting part and having transverse corrugations forming convex bearing-rings for the purpose stated.

3. In a wind-pipe instrument of the class described and in combination with the register-chambers, the wind-chest and the speaking-pipes, of a pneumatic valve for each pipe consisting of tubular telescoping parts having thin walls, the adjacent telescoping surfaces forming a seal against the passage therebetween of interiorly-confined air, the fixed part seated in a counterbore in the bottom of the register-chamber and opening into it, and a closely-fitting slidable part having a flat cap and forming the sealing-face, a cushion for the sealing-cap and a cushion for the open end of said slidable valve part and means for controlling the air-pressure within said valve.

4. In a pneumatic pipe-organ valve and in combination with the register-chambers, the wind-chest, and the pipes, of a valve composed of two malleable sheet-metal tubular closely-fitting telescoping parts, the adjacent telescoping surfaces forming a seal against the passage therebetween of interiorly-confined air, the inner part being the longest and both parts having a length about three times greater than its diameter for the purpose stated.

5. A pneumatic valve for pipe-organs consisting of two separate tubular telescoping members, the inner part open at both ends and supporting the outer closely-fitting telescoping cap part, closed at one end, the closed end being flat and forming a seal for the port, the adjacent telescoping surfaces of said valve members forming a seal against the passage therebetween of interiorly-confined air.

6. In a pneumatic action for wind instruments, the combination, with the main wind-chest and register-chambers, of the pneumatic valves for the ports leading from the main wind-chest to the several register-chambers and the ports leading from the register-chambers to the sound-producing devices, said valves consisting of a tubular fixed member open at both ends supported upon the bottom walls of and projecting into the main or register wind chests or chambers directly opposite the ports leading therefrom to the register-chambers or sound-producing devices, the fixed end in communication with the air-ducts from the stop-pallet box or key-pallet box and a tubular slidable member, closed at one end and telescoping with said fixed tubular member, the adjacent telescoping surfaces of said tubular members forming an air seal against the passage therebetween of air to and fro from the key or stop pallet box.

7. The pneumatic valve herein described consisting of a fixed tubular member open at both ends and a tubular slidable member closed at one end, and telescoping with said fixed tubular member the adjacent telescoping surfaces of said members forming an air seal against the passage therebetween of interiorly-confined air, said valve being arranged within the register-chamber or main wind-chest, as the case may be, and operated by the difference between the pressure of the interiorly-confined air and the air of main or register wind chambers or chests, substantially as set forth.

In testimony whereof I affix my signature in presence of two witnesses.

GOTTLIEB SOMMER.

Witnesses:
A. E. H. JOHNSON,
A. ROLAND JOHNSON.